United States Patent [19]
Takano

[11] Patent Number: 5,884,048
[45] Date of Patent: Mar. 16, 1999

[54] DIGITAL AUDIO SIGNAL PROCESSOR HAVING SMALL INPUT BUFFER

[75] Inventor: Hideto Takano, Tokyo, Japan

[73] Assignee: NEC Corporation, Tokyo, Japan

[21] Appl. No.: 806,982

[22] Filed: Feb. 26, 1997

[30] Foreign Application Priority Data

Feb. 28, 1996 [JP] Japan ................................ 8-041150

[51] Int. Cl.⁶ ................................................. G04N 1/413
[52] U.S. Cl. ............................... 395/200.77; 395/200.37
[58] Field of Search ................ 364/400.01; 395/200.77, 395/200.32, 888, 800.35; 704/500, 501, 503; 711/100, 111

[56] References Cited

U.S. PATENT DOCUMENTS

5,479,562 12/1995 Fiedler et al. ........................ 704/229
5,515,397 5/1996 Wiorek .................................. 375/216

*Primary Examiner*—Thomas Peeso
*Attorney, Agent, or Firm*—Sughrue, Mion, Zinn, Macpeak & Seas, PLLC

[57] ABSTRACT

A digital audio signal processing circuit according to the present invention inputs a bit stream 1, which has a configuration including an additional information and several samples of the compressed audio signals, and decodes it. The input buffer size is designed by subtracting the size of inputting bits of the bit stream 1 while the signal processor 10 processes the sample from the total bits of the largest additional information and first sample.

16 Claims, 9 Drawing Sheets

DIGITAL AUDIO SIGNAL PROCESSOR HAVING SMALL INPUT BUFFER

BACKGROUND OF THE INVENTION

1. Field of the Invention

The present invention relates to an audio signal processing apparatus and method. In particular, the present invention relates to an audio signal decoding circuit wherein the information content of the audio signal is compressed.

1. Description of the Related Art

Conventionally, in compressing/expanding systems for a digital audio signal, the so-called standardized MPEG/Audio is available. In the data compressing/expanding according to this standard, the bit system of compressed digital audio signal includes additional information such as a header as well as several samples. In addition, a scheme of expanding the compressed audio-signal (bit stream) is defined in the standardized compressing/expanding system.

There are several schemes in the MPEG/Audio. Here, one of them, Layer I system, will be described below.

According to the Layer I system, information content is compressed in such a manner that a digital audio signal is divided into 32 frequency bands and the number of quantization bits is adequately changed in accordance with digital audio signal.

The number of bits in one frame according to Layer I system is determined by the bit rate and the sampling frequency in accordance with Expression (1):

$$\text{the number of bits in one frame} = \text{bits rate} * 384/\text{sampling frequency} \quad (1)$$

Here, 384 is determined by the number of frequency bands (32) and the number of sample (12), or 12 times 32 makes 384. Accordingly, assuming that the sampling frequency is 32 KHz and the bits rate is 448 Kbps, the number of bits in one frame is 5376 bits.

Figure 1:
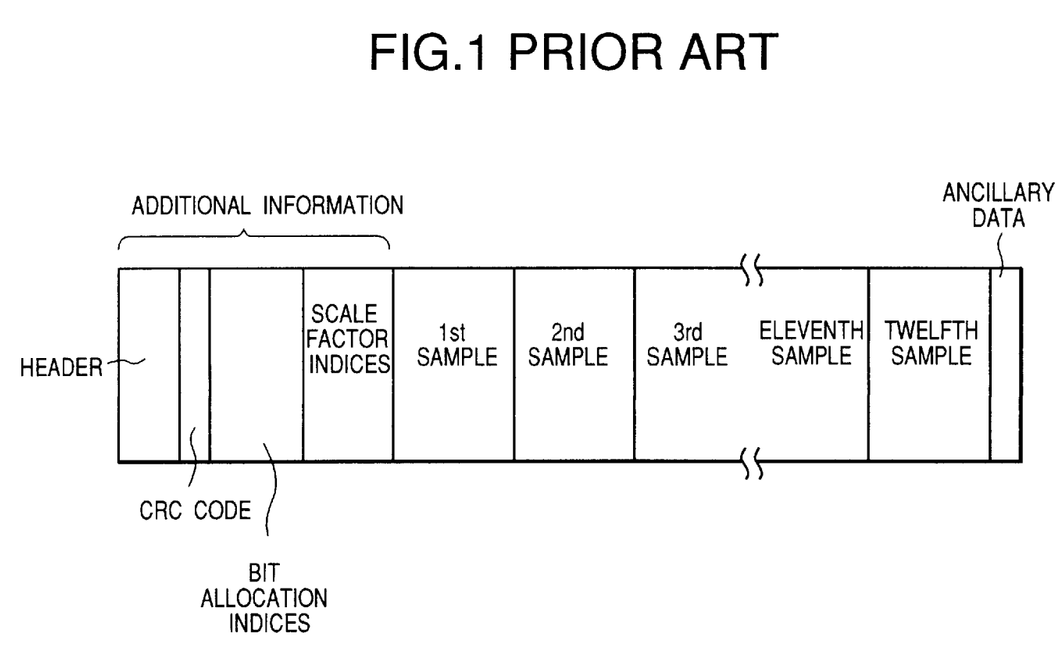
FIG. 1 shows a configuration of one ordinary frame of a bit stream for MPEG/Audio.

Referring now to FIG. 1, one frame of Layer I system has additional information such as a header, a CRC (Cyclic Redundancy Check) code, bit allocation indices, scale factor indices and has first through twelfth samples and ancillary data. The header consists ordinarily of 32 bits. The bit allocation indices requires 4 bits per the frequency band and therefore 128 bits for one channel and 256 bits for two channels. In this connection, the header includes a bit which shows the existence of the CRC code and when the CRC code exists, an additional 16 bits are required as CRC code.

In the following description, the number of bits of the scale factor indices and the samples is variable due to the characteristic of the compressed audio signal. When the bit allocation index for each of the frequency bands is not 0, each of the scale factor indices requires 6 bits for each of the frequency bands. In this case, 12 times the number of bits indicated by the bit allocation index of each band is required. This is because 12 samples are included in each of the bands in the direction of time. Therefore, the remainder in subtraction of the aforementioned required number of bits from the total number of bits in one frame is the number of the ancillary data. Ordinary, the ancillary data is negligible information.

Since one frame of the bit-stream is structured as described above, in order to output the first sample of the twelve samples, or the audio signal of the first sample, the total bits of the additional information and the first sample has to be processed within a prescribed time (hereinafter this time is referred to as a unit time). However, in the second sample and the samples after the second sample, only one sample have to be processed within the unit time. Therefore, bias occurs such that the number of bits in the first sample in the frame is larger than the rest of the samples.

Figure 2:
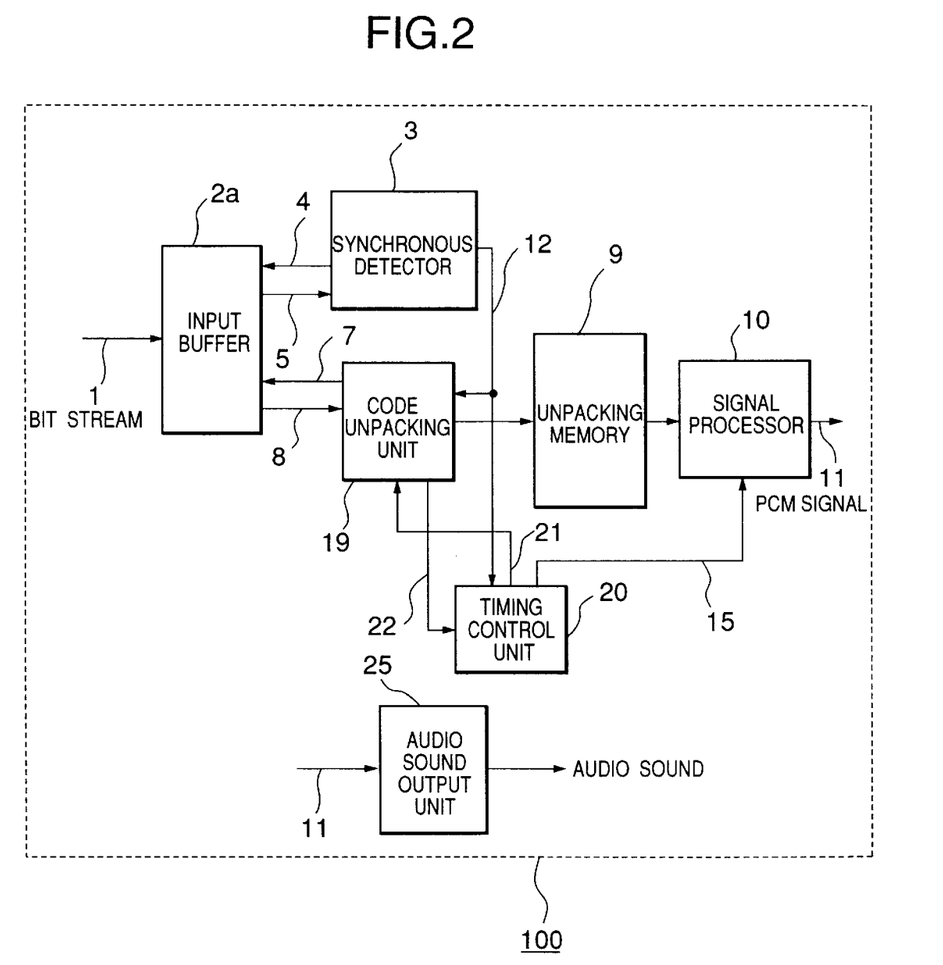
FIG. 2 shows a digital audio signal processing circuit as one of prototype.

In order to realize decoding the aforementioned audio signal, the inventor has designed the first circuit as shown in FIG. 2 as a prototype. In this prototype circuit 100, a bit stream 1 is supplied to and thus temporarily stored in an input buffer 2a. The input buffer 2a outputs a bit stream 5 in response to a request signal 4 from a synchronous detector 3. The synchronous detector 3 detects a synchronous position in a bit stream 5 and generates a synchronous detection signal 12 when a prescribed synchronous signal pattern appears in the header in one frame of the bit stream 1. When the synchronous detection signal 12 is outputted, a code unpacking unit 19 generates a request signal 7 to the input buffer 2a which in turn returns a bit stream 8 to the code unpacking unit 19 in response to the request signal 7. The code unpacking unit 19 unpacks the bit stream 8 into each element and outputs the each element to an unpacking memory 9. Furthermore, the code unpacking unit 19 generates a code unpacking termination signal 22 when the unpacking is completed. A signal processor 10 performs a decoding operation using information stored in the unpacking memory 9 to convert the result into a PCM code 11 and to output the PCM code 11 in a constant interval of time. A timing control unit 20 outputs a control signal 15 and a control signal 21 in response to the synchronous detection signal 12 and the code unpacking termination signal 22 so as to control accesses to the unpacking memory 9 from the signal processor 10 and the code unpacking unit 19 so that they can alternatively in a constant period of time make an access to the unpacking memory 9. Also, an audio sound output unit 25 outputs an audio sound in accordance with the PCM code 11 from the signal processor 10.

Figure 3:
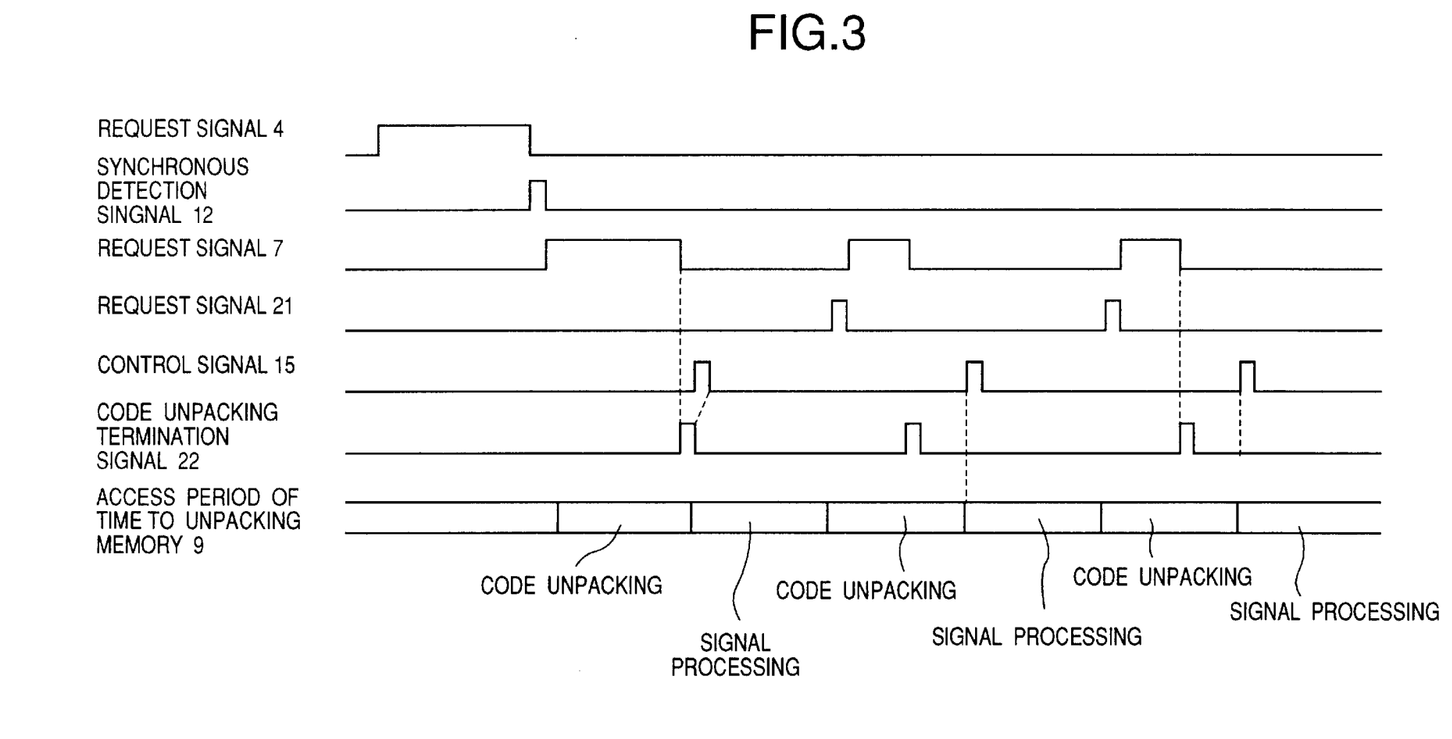
FIG. 3 is a timing chart on various signals to explain the circuit operation as shown in FIG. 2.

Referring now to FIG. 3, this is a timing chart of the prototype circuit 100 shown in FIG. 2. As shown in FIG. 3, responding to the bit stream 1 is inputted into the input buffer 2a at a constant period, the synchronous detector 3 outputs a request signal 4. When the synchronous detector 3 detects the synchronous position in the header, the synchronous detector 3 outputs the synchronous detection signal 12 and stops the request signal 4. Accordingly, the code unpacking unit 19 outputs and the request signal 7 in response to the synchronous detection signal 12. Thus, the code unpacking unit 19 is supplied the additional information and the first sample. Then, the code unpacking unit 19 unpacks the first sample in accordance with the bit allocation indices and outputs the first sample and scale factor indices to the unpacking memory 9. At this moment, the code unpacking unit 19 stops the request signal 7 and outputs the code unpacking termination signal 22. The operation of the code unpacking unit 19 is represented in FIG. 3 as CODE UNPACKING. Next, the timing control unit 20 outputs the control signal 15 in response to the code unpacking termination signal 22 only when dealing with the first sample in the first frame. This control signal 15 causes the signal processor 10 to start signal-processing. After the first sample, the timing control unit 20 controls the timing of both the code unpacking unit 19 and the signal processor 10 by outputting the control signal 15 and the control signal 21 respectively, for allowing them to alternatively operate on the unpacking memory 9 up to the twelfth sample at fixed intervals of time. In short, the timing control unit 20 controls both a period of CODE UNPACKING and SIGNAL PROCESSING.

After completing the operation to the twelfth sample, the ancillary data is read from the input buffer 2a.

Up to here is the description of the operation for the first frame. Following frames after the second are processed in the same manner.

At the first, the inventor assumes that the input buffer 2a has a capacity of one frame. Because, a general circuit for MPEG/Audio has been processing in a unit of one frame. Therefore, in order to generally design the circuit, the capacity of the input buffer 2a is applied the amount of one frame.

Figure 4:
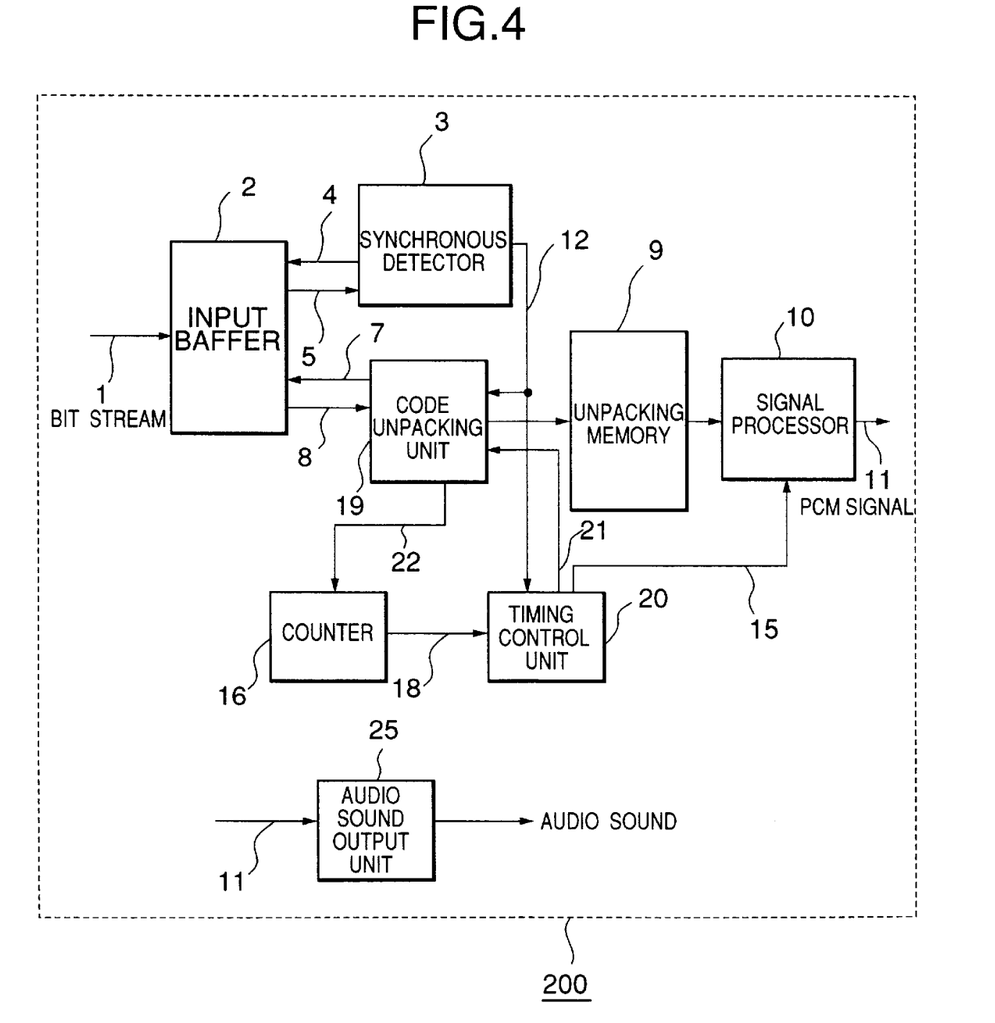
FIG. 4 shows a digital audio signal processing circuit as another prototype.
Figure 5:
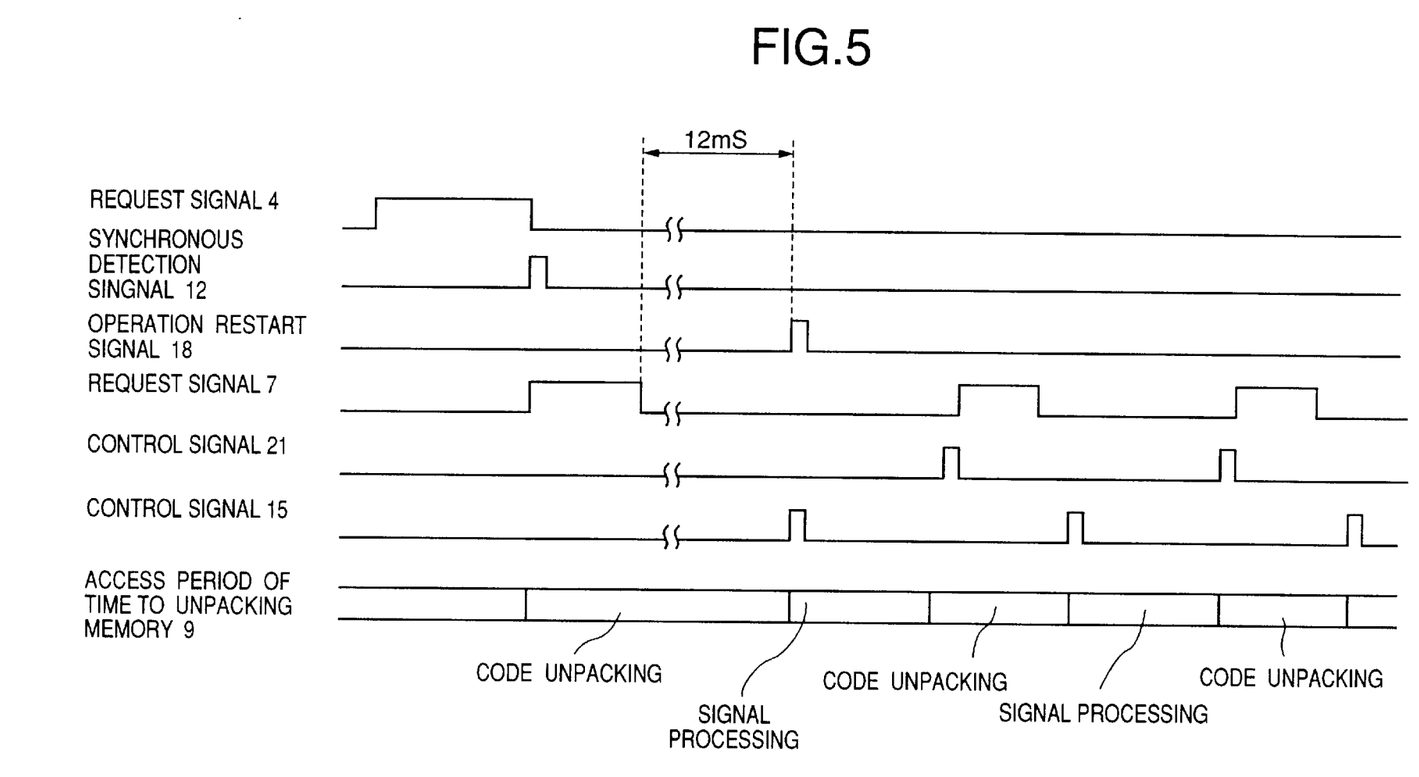
FIG. 5 is a timing chart on various signals to explain the circuit operation as shown in FIG. 4.

Referring now to FIGS. 4 and 5, there are circuit diagram of another prototype circuit 200 and a timing chart of the circuit 200, in which the same constituents as those shown in FIGS. 2 and 3 are denoted by the same reference numerals or symbols.

The status at the start time of signal-processing on the first sample in the first frame in the prototype circuit 200 will be described below.

To begin with, the bit stream 1 is supplied with the input buffer 2a. Therefore, the synchronous detector 3 generates the synchronous detection signal 12 in order to synchronize for each part of the circuit 200. Then, the code unpacking unit 19 unpacks the first sample. However, the input buffer 2a had accumulated the number of bits of one frame before the signal processor 10 had begun to decode. Accordingly, the timing control unit 20 generating the control signal 15 had to wait until the period of 12 ms with the sampling frequency of 32 KHz, or that of one frame, from a point of rising down of request signal 7. For this reason, a counter 16 counts to the period of one frame in response to the code unpacking termination signal 22 from the code unpacking unit 19. The counter 16 counts a clock, e.g. a master clock for the digital audio processor. When the count is finally over, the counter 16 generates an operation restart signal 18 to the timing control unit 20. The timing control unit 20 had reserved to generate the control signal 15 until a generation of the operation restart signal 18.

At the start time of signal-processing, the number of bits of the second frame stored in the input buffer 2a is the same as the number of bits of the additional information in the first frame and that of the first sample.

Thus, when the sum of the number of bits of additional information in the second frame and that of the first sample is larger than the sum of the number of bits of the additional information in the first frame and that of the first sample, the additional information in the second frame and that of the first sample are not completely inputted to the input buffer 2a. For this cause, if the above-processing continues, the signal processor 10 may give off an unnecessary sound owing to insufficient data read out of the unpacking memory 9.

Therefore, in order to prevent the unnecessary sound from occurring, it is required that a sufficiency capacity in the input buffer 2a, e.g. 1.5 frames.

However, since the prototype circuit as described above needs an input buffer with a capacity of the total number of bits in one frame or more to store a bit stream temporarily, there are disadvantages in that the scale of processing circuit becomes large and its cost becomes high.

Further, the timing control circuit 20 waits to generate the control signal 15 as long as the counter 16 counts to the period of one frame. Therefore, the start time of signal-processing is late.

SUMMARY OF THE INVENTION

It is, therefore, an object of the present invention to provide a further improved circuit suitable for compressing/ expanding systems for a digital audio.

It is another object of the present invention to provide a digital signal processor for MPEG/Audio which has a small size.

It is still another object of the present invention to provide a decoder circuit for MPEG/Audio which has a small input buffer circuit and speedy operation.

A digital audio signal processor according to the present invention is featured by employing an input buffer having a capacity which being optimum designed. A size of the input buffer 2 is defined by subtracting the number of inputting bits of a frame information, or the bit stream 1 to the input buffer 2 while the signal processor 10 processes an unpacked sample in the unpacking memory 9 from the total number of bits of the additional information and the first sample, preferably the additional information is the largest condition in various conditions.

Accordingly, the size of the input buffer 2 is very small so that the counter 14 generating the operation restart signal 18 for the signal processor 10 is advanced.

Other features and advantages of the present invention will be apparent from the following description taken in conjunction with the accompanying drawings, like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

Figure 6:
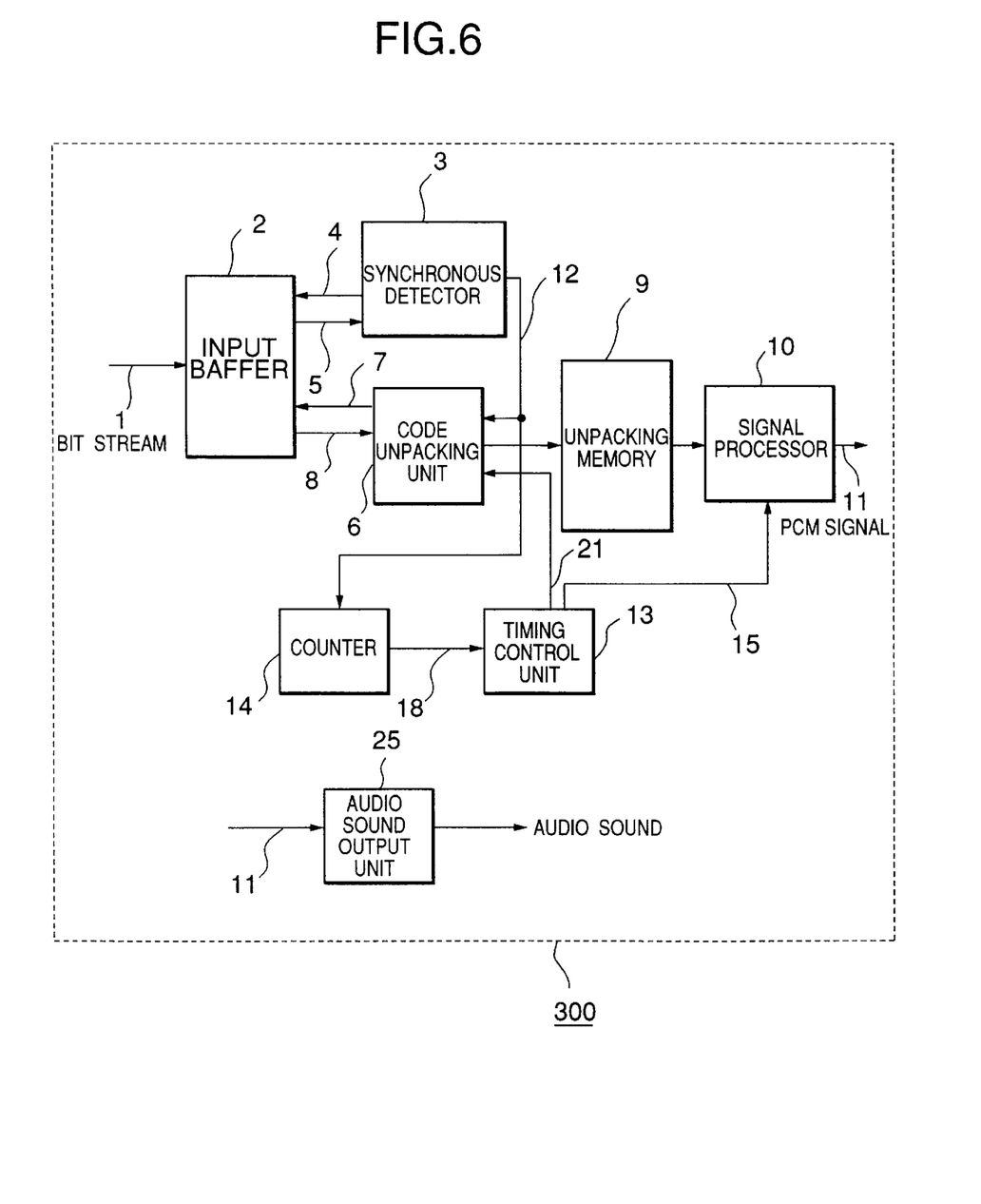
FIG. 6 shows a digital audio signal processing circuit as an embodiment of this invention.

Referring now to FIG. 6, there is a figure illustrating an audio signal processing circuit of an embodiment of the present invention, in which the same constituents as those shown in FIGS. 2 and 4 are denoted by the same reference numerals or symbols to omit the further description thereof. In this circuit 300, an operation of a counter 14 is different from the circuit 200 of the above prototype.

Figure 7:
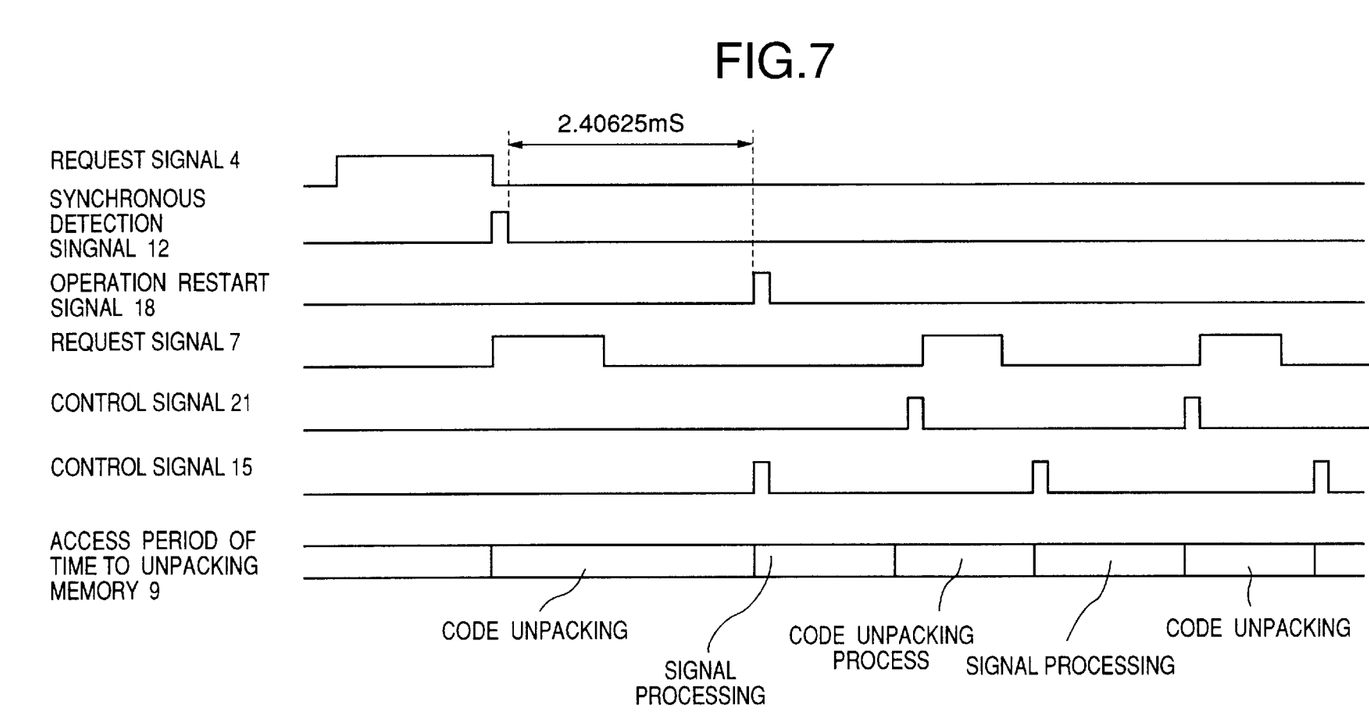
FIG. 7 is a timing chart on various signals to explain the circuit operation as shown in FIG. 6.

FIG. 7 is a timing chart on various signals to describe the operation of the audio signal processing circuit as shown in FIG. 6. As shown in FIG. 7, the counter 14 starts counting in response to the synchronous detection signal 12, and after counting for a fixed period, or about 2.4 ms, the operation restart signal 18 is outputted. Accordingly, the timing control unit 13 starts the operation of the signal processor 10 by outputting the control signal 15. After that, the timing control unit 13 outputs the control signal 21 to make the operation of the code unpacking unit 6 restart. Then the timing control unit 13 outputs the control signals 15 and 21 to make the signal processor 10 and the code unpacking unit 6 alternatively operate in at fixed periods of time repeatedly.

In this connection, the aforementioned fixed period of time during which the counter 14 counts is the same as the time of inputting the maximum number of total bits of the additional information and the first sample.

Further, the ratio of the fixed periods of time is set to 1:1 in order to simplify the description on the embodiment. It should be readily understood that other than the ratio 1:1 can also be set to the aforementioned fixed periods of time.

The designing for the optimum size of the input buffer 2 is as follows. When the number of bits of the additional information becomes maximum is, in 2 channel mode, when samples are assigned to all the 32 sub-bands with a CRC code. This condition will be referred to as maximum condition below. In the maximum condition, the header and the CRC code need 32 bits and 16 bits respectively. Further, since the bit allocation indices has 4 bits for one sub-band, 256 bits are needed. Also, since the scale factor indices has 6 bits for one sub-band, 384 bits are needed. Altogether, 688 bits are needed. Since the number of bits in one frame is 5376 bits which is obtained by substituting 32 kHz and 448 Kbps for the sampling frequency and the bit rate in Equation (1), the number of bits in each sample in this condition is calculated through the following Expression (2):

$$(5376-688)/12 \approx 390 \tag{2}$$

Accordingly, with Expression (2) the total number of bits of the additional information and that of the first sample is calculated through the following Expression (3):

$$688+390=1078 \text{ bits} \tag{3}$$

In addition, the number of the bits of the ancillary data is calculated through the following Expression (4):

$$5376-(688-390*12)=8 \text{ bits} \tag{4}$$

Thus, the time necessary to input 1078 bits of bit stream with 448 Kbps calculated through the following Expression (5):

$$1078/448=2.40625 \text{ ms} \tag{5}$$

Consequently, the counter 14 outputs the operation restart signal 18 2.40625 ms after the synchronous signal 12 is inputted.

Next, in the aforementioned maximum condition, the number of the bits of the input buffer 2 to prevent an overflow or an under-flow from occurring at the input buffer 2 will be described below with reference to FIG. 8.

Figure 8:
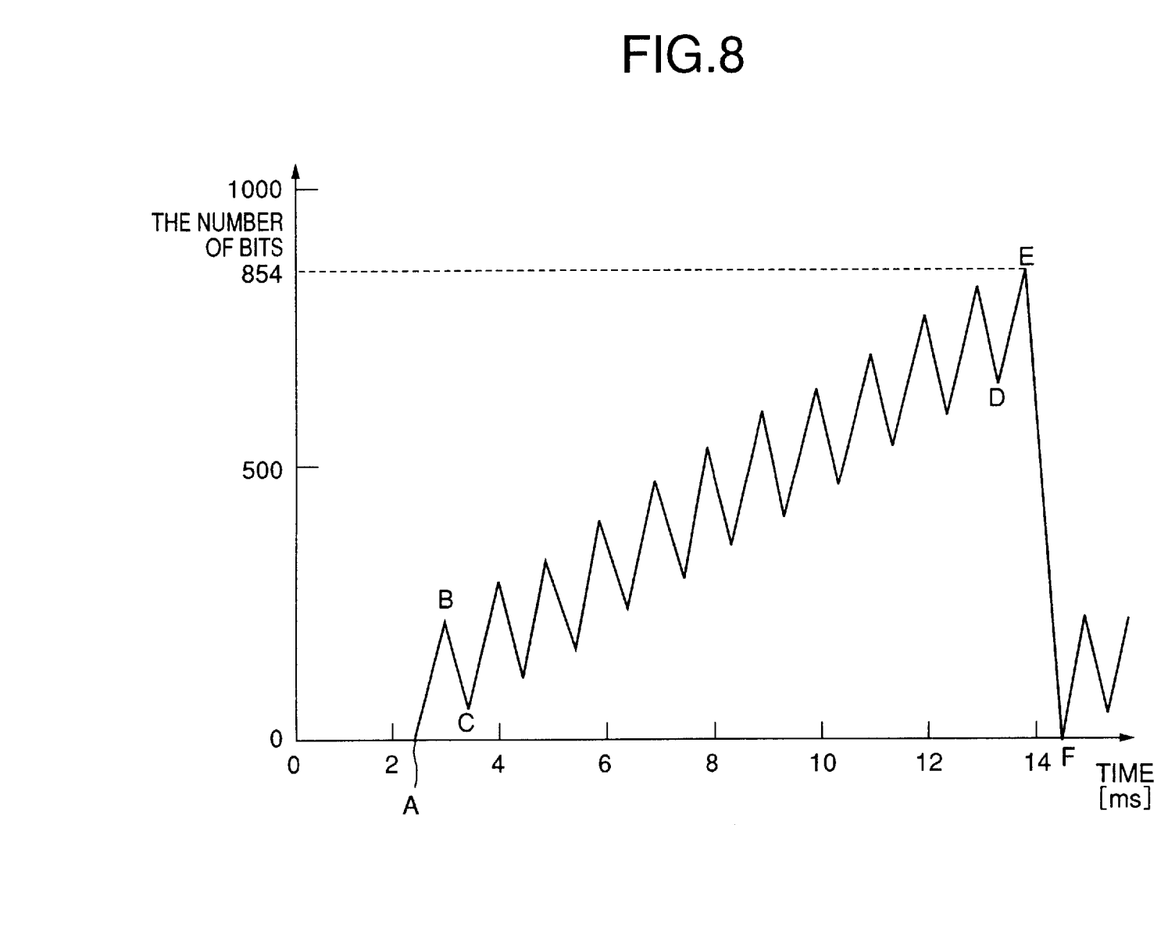
FIG. 8 is a graph showing the total number of the additional information and the first sample in the maximum condition in the circuit shown in FIG. 6.

FIG. 8 is a graph in the maximum condition regarding the total number of bits of the additional information and the first sample derived under the operation of the circuit shown in FIG. 6. As shown in FIG. 8, a point A denotes a point of time when the counter 14 generates the operation restart signal 18 (or the code-unpacking process on first sample of the first frame ends), a point B denotes a point of time when the code unpacking process on second sample starts, a point C denotes a point of time when the code unpacking process on the second sample ends, a point of D denotes a point of time when the code unpacking process on twelfth sample ends, a point of E denotes a point of time when the code unpacking process on second frame starts and a point of F denotes a point of time when the code unpacking process on first sample in the second frame ends. In the maximum condition, when observing changes of the number of bits stored in the input buffer 2 without occurrence of overflow or underflow, the number of bits inputted within one sample processing period (1/12 frame) is shown with the following Expression (6):

$$5376/12=448 \text{ bits} \tag{6}$$

Further, the number of bits inputted before the point B is shown with the following Expression (7) in accordance with the fact that the ratio of processing between the code unpacking unit 6 and the signal processor 10 is 1:1 as mentioned above.

$$448/2=224 \text{ bits} \tag{7}$$

Furthermore, the maximum number of bits stored in the buffer 2 at the point of C is processed are shown in the following Expression (8). In short, it subtracts the number of bits of one sample from the bit stream which being inputted in the input buffer 2 for between the point A and the point C:

$$-390=58 \text{ bits} \tag{8}$$

Accordingly, at the point D, eleven times as many bits expressed in Expression (8) (58 bits) are stored in the input buffer 2, and then the eight bits of the ancillary data is read. Consequently, the number of bits being stored in the input buffer 2 is followed with Expression (9):

$$58*11-8=630 \text{ bits} \tag{9}$$

Further, the number of bits inputted by the point E is 224 bits as shown in Expression (7) and thus the number of bits having been stored in the input buffer 2 is shown in the following Expression (10):

$$630+224=854 \text{ bits} \tag{10}$$

When the code unpacking process on the first sample in the second frame starts, due to the additional information at the lead of the frame, the number of bits processed by the code unpacking unit 6 within the time in which the sample is unpacked is larger than that of bits inputted into the input buffer 2 and the number of bits having been stored in the input buffer 2 approaches to zero. Further, since the maximum total number of bits of the additional information and the first sample bits is 1078 bits as shown at Expression (3) and as compared to the fact that the total number of the bits remained at the point E and 224 bits inputted by the point F is shown at the following Expression (11), no under-flow occurs:

$$854+224=1078 \text{ bits} \tag{11}$$

Therefore, in accordance with the above-mentioned Expression (10) 854 bits is the maximum number of the bits stored in the input buffer 2.

On the other hand, the number of bits stored by the time of outputting the operation restart signal 18 becomes maximum when the total number of bits of the additional information and the first sample is minimum (hereinafter this case is referred to as minimum condition). Changes in the number of bits having stored in the input buffer 2 will be described with reference to FIG. 9.

Figure 9:
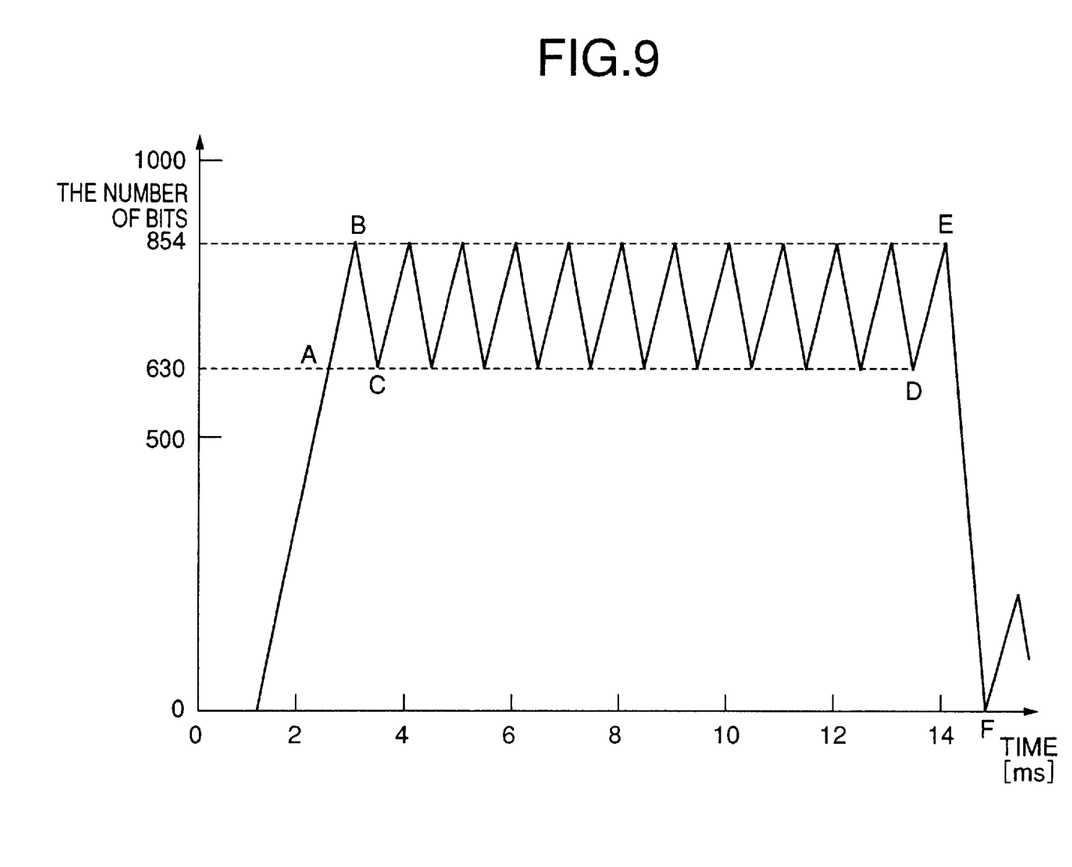
FIG. 9 is a graph showing the total number of the additional information and the first sample in the minimum condition in the circuit shown in FIG. 6.

FIG. 9 is a graph illustrating the total number of bits of the additional information and the first sample in the minimum condition. As shown in FIG. 9, the point A denotes the point of time when the operation restart signal 18 is generated, the points B through F are the same as the ones in FIG. 8. In the minimum condition, or the case that the total number of bits of the additional information and the samples becomes minimum occurs when the number of bits of the additional information becomes minimum. Supposing that the number of bits of the additional information is zero, the number of bits of one sample becomes a twelfth as many bits as that of one frame. Accordingly, the total number of bits of the additional information and the first sample is always not less than a twelfth in one frame. Consequently, the minimum total number of bits of the additional information and the first sample is shown at the following Expression (12):

$$5376/12=448 \text{ bits} \tag{12}$$

Further, the number of bits inputted by the time of outputting the operation restart signal 18 is 1078 bits in accordance with Expression (3). Therefore, the number of bits having been stored by the time of outputting the operation restart signal 18, or by the point A, is shown at the following Expression (13).

$$1078-448=630 \text{ bits} \tag{13}$$

Furthermore, since the number of bits inputted within the range from the point A until the point B is 224 bits in accordance with the Expression (7), the number of bits stored at the point B is shown at the following Expression (14):

$$630+224=854 \text{ bits} \tag{14}$$

Here, since the number of inputted bits by the point C after one sample period from the point A is 448 bits as shown at the Expression (6) and the number of bits of the sample processed by the code unpacking unit 6 is 448 bits in accordance with the Expression (12). Accordingly, in the minimum condition, the number of bits stored in the input buffer 2 after one sample period does not change. Therefore, at the point D, the number of bits stored in the input buffer 2 is 630 bits.

Since the number of inputted bits by the point E is 224 bits as shown at the Expression (7), the number of bits stored in the input buffer 2 at the point E is shown at the following Expression (15).

$$630+224=854 \text{ bits} \tag{15}$$

Therefore, even in the minimum condition, like in the maximum condition, if the capacity of the input buffer 2 is 854 bits, no over-flow or under-flow occurs. The input buffer 2, thus, needs only 856 bits which are approximately 16% of 5376 bits necessary for the prototype circuit.

To sum up, the digital audio signal processing circuit in accordance with the above embodiment designs in which the size of the input buffer is determined by subtracting the number of inputting bits to the input buffer while the signal processor processes the sample from the total number of bits of the additional information and that of the first sample in the maximum condition. As a result, the input buffer size can be optimized and reduced.

Further, by making the operating configuration of the embodiment in such a way that the first sample is subjected to signal processing including the unpacking process as described above after the given time for inputting a maximum number of total bits of the additional information and the first sample, the start time of the signal processing can be speedy.

Also, the reduction of the input buffer's size makes the cost of the digital signal processing apparatus of the embodiment according to the present invention very low.

As many apparently widely different embodiments of the present invention can be made without departing from the spirit and scope thereof, it is to be understood that the invention is not limited to the specific embodiments thereof except as defined in the appended claims.

What is claimed is:

1. A digital signal processor for audio signal data transferred in a bit stream, one frame of said audio signal data consisting of a first number of bits and including an additional information and at least one sample, said digital signal processor comprising an input buffer circuit consisting of a second number of bits that is smaller than said first number of bits to thereby temporarily store a part of each frame of audio signal data, an unpacking circuit unpacking said additional information and said at least one sample from said input buffer to output an unpacked sample, and a signal processing circuit decoding said unpacked sample to output a decoded signal.

2. The processor as claimed in claim 1, wherein said second number of bits is defined by subtracting a number of inputting bits of said bit stream to said input buffer while said signal processing circuit processes said unpacked sample from a total number of bits of said additional information and said at least one sample.

3. The processor as claimed in claim 1, wherein said additional information of said frame information is variable, said second number of bits is defined by subtracting a number of inputting bits of said bit stream to said input buffer while said signal processing circuit processes said unpacked sample from a maximum number of total bits of said additional information and said at least one sample.

4. The processor as claimed in claim 1, wherein a format of said bit stream manner is standardized in MPEG/Audio.

5. A digital signal processor for digital audio signal data transferred in a bit stream, one frame of said audio signal data consisting of a first number of bits and including an additional information and at least one sample, said digital signal processor comprising a storage circuit temporarily storing said bit stream at a fixed speed, said storage circuit consisting of a second number of bits that is smaller than said first number of bits, and a processing circuit operating which unpacking and decoding said additional information and said at least one sample stored in said storage circuit;

wherein said processing circuit halts said decoding operating after said unpacking operation, and starts said decoding operation in a given period of time which is less than a period of inputting said one frame of said audio signal to said input buffer.

6. The processor as claimed in claim 5, wherein a length of said additional information varies, and wherein said given period of time is set for inputting a maximum number of total bits of both said additional information and said at least one sample.

7. The processor as claimed in claim 5, further comprising a counting circuit counting for said given period of time to control both a halt and a start times of said processing circuit, said counting circuit starting when said top of said bit stream is inputted into said storage circuit and stopping at an end of said given period of time.

8. The processor as claimed in claim 7, wherein said additional information includes a prescribed synchronous signal pattern to indicate said top of said bit stream;

said digital signal processor further comprising a synchronous detection circuit detecting said prescribed synchronous signal pattern to make said counting circuit start counting.

9. The processor as claimed in claim 7, wherein said bit stream includes a plurality of said frames, said counting circuit starting when a first frame of said plurality of frames is inputted into said storage circuit and stopping at an end of said given period of time.

10. The processor as claimed in claim 5, wherein a format of said bit stream is standardized in MPEG/Audio.

11. The processor as claimed in claim 5, wherein said processing circuit decodes said at least one sample and outputs a PCM code; and wherein said digital signal processor further comprises an output circuit for outputting an audio sound in accordance with said PCM code.

12. A digital signal processing method for digital audio signal data transferred in a bit stream, one frame of said audio signal data consisting of a first number of bits and including an additional information and at least one sample, said digital signal processing method comprising:

a storing step of temporarily storing said bit stream at a fixed speed into a storage means which consists of a second number of bits that is smaller than said first number of bits;

an unpacking step of unpacking said additional information and said at least one sample stored in said storage means; and a decoding step of decoding said at least one sample, said decoding step starting in a given period of time which is less than a period of time for inputting said bit stream to said storage means.

13. The processing method as claimed in claim 12, wherein a length of said additional information varies, wherein said given period of time is set for inputting a maximum number of total bits of both said additional information and said at least one sample.

14. The processing method as claimed in claim 12, further comprising a counting setp of counting for said given period to control a starting time of said decoding operation of said decoding step;

wherein said counting step starts when a top of said bit stream is inputted into said storage means and stops at an end of said given period of time.

15. The processing method as claimed in claim 14, wherein said additional information includes a prescribed synchronous signal pattern to indicate said top of said bit stream;

said digital signal processing method further comprising a synchronous detection step of detecting said prescribed synchronous signal pattern to make said counting step start counting.

16. The processing method as claimed in claim 14, wherein said bit stream includes a plurality of said frames, and wherein said counting step starts when a first frame of said plurality of frames is inputted into said storage means and stops at an end of said given period of time.

* * * * *

UNITED STATES PATENT AND TRADEMARK OFFICE
CERTIFICATE OF CORRECTION

PATENT NO. : 5,884,048
DATED : March 16, 1999
INVENTOR(S) : Hideto TAKANO

It is certified that error appears in the above-indentified patent and that said Letters Patent is hereby corrected as shown below:

Column 6, line 30, delete "-390 = 58" and insert --448-390 = 58--.

Signed and Sealed this

Thirtieth Day of November, 1999

Attest:

Q. TODD DICKINSON

Attesting Officer

Acting Commissioner of Patents and Trademarks